Nov. 26, 1968 C. L. CHAMPLIN 3,412,422
HANDLE ASSEMBLY
Filed April 22, 1966
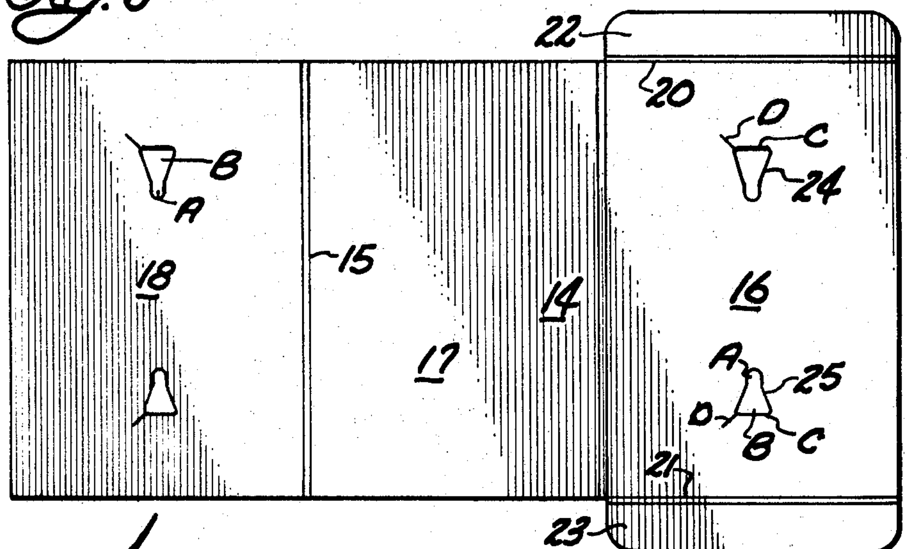
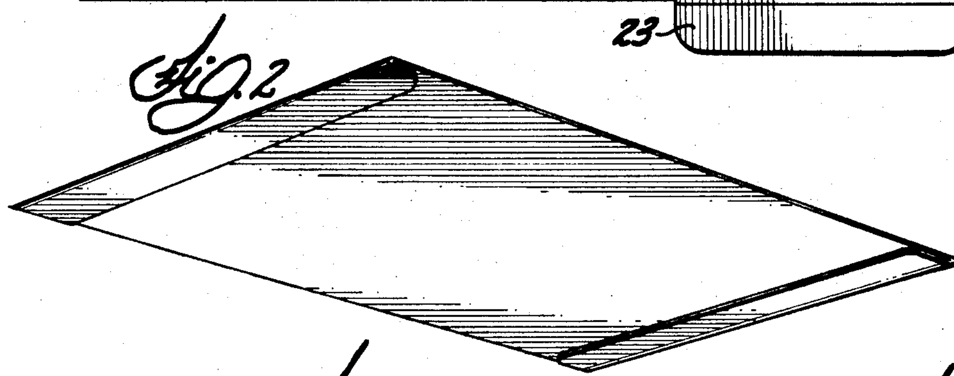
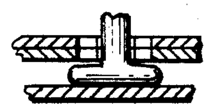
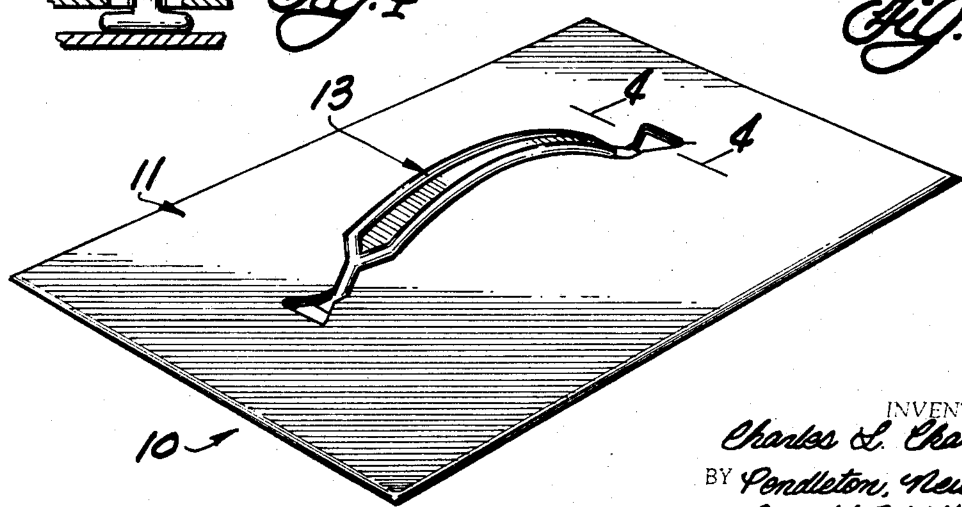
INVENTOR.
Charles L. Champlin
BY Pendleton, Neuman, Seibold & Williams
Attorneys United States Patent Office 3,412,422
Patented Nov. 26, 1968

3,412,422
HANDLE ASSEMBLY
Charles L. Champlin, Rittman, Ohio, assignor to Packaging Corporation of America, Evanston, Ill., a corporation of Delaware
Filed Apr. 22, 1966, Ser. No. 544,525
1 Claim. (Cl. 16—125)

This invention relates to a handle assembly which is adapted to be used in combination with fibreboard containers and the like.

In recent years it has become increasingly more popular for the housewife to purchase, detergents, soaps, and other powdered or granulated products in large quantities amounting to twenty pounds or more dry weight. Heretofore, some problems have arisen in the packaging of such products with regard to providing a handle which is not only comfortable and convenient to grasp, but will not weaken the structure of the container itself. Handles made integral with the container have generally not successfully fulfilled both of these requirements and for this reason therefore it has become quite customary to employ a separate handle assembly in conbination with the container blank.

Various handle assemblies have heretofore been provided; however, because of certain design characteristics they are beset wth one or more of the following shortcomings: (a) they are of a complex and costly construction; (b) they render the container susceptible to leakage or infestation; and (c) they are difficult to apply or incorporate within the container.

Thus, it is an object of this invention to provide an improved handle assembly which adequately fulfills the aforenoted requirements.

It is a further object of this invention to provide an improved handle assembly which avoids the shortcomings of the prior structures.

Further and additional objects will appear from the description, accompanying drawings, and appended claims.

In accordance with one embodiment of this invention, a handle assembly is provided for use with a container preferably formed from a blank of fibreboard material. The assembly comprises a base member which is adapted to engage a concealed surface of the container, and a handle connected to said base member and projecting outwardly therefrom and from the container. The base member includes a plurality of foldably connected panels arranged in superimposed relation and with one of the panels sandwiched between a pair of second panels. One of the second panels is provided with a pair of foldable end flaps which are secured to the corresponding portions of the other second panel.

For a more complete understanding of this invention reference should be made to the drawing wherein:

FIGURE 1 is a perspective view of the assembly.

FIG. 2 is a perspective view of the underside of the assembly shown in FIG. 1.

FIG. 3 is a plan view of the blank for forming the base member.

FIG. 4 is an enlarged fragmentary sectional view taken along line 4—4 of FIG. 1.

Referring now to the drawings, an improved handle assembly 10 is shown in FIG. 1 which is adapted for use with a container, not shown, in order to facilitate the carrying of same. The assembly is generally disposed at the upper end of the container and preferably between the end closure flaps thereof, particularly when the container is of a seal end type and the problem of leakage or infestation is of concern.

The assembly 10 in this instance includes a base member 11 formed from a blank 12 and a handle element 13 which is adjustably connected to member 11 and extends outwardly therefrom.

Blank 12, as illustrated, is formed of a sheet of stiff fibreboard material and includes a pair of relatively wide folding scores 14 and 15 which cooperate with the periphery of the blank so as to form a top panel 16, a bottom panel 17, and an intermediate panel 18 arranged in side by side relation. Connected by foldline 20 and 21 to the top and bottom edges of panel 16 are end flaps 22 and 23, respectively. If desired, the flaps 22 and 23 may be foldably connected to the corresponding edges of panel 17 or one flap might be conected to one edge of panel 16 and a second flap might be connected to the opposite edge of panel 17. The function of flaps 22 and 23 will be discussed more fully hereinafter.

Panels 16 and 18 in the illustrated embodiment are each provided with a pair of spaced apertures 24 and 25. Each pair of apertures are aligned on a longitudinal centerline of the panel 16 or 18. Apertures 24 and 25 are of like configuration but are inverted with respect to one another. The inner portion A of each aperture is elongated and narrow and is disposed adjacent the other aperture of the pair. The outer portion B of each aperture is enlarged and may be substantially triangular in shape with one side C of portion B being disposed in spaced, substantially parallel relation with foldline 20 or 21. At one end of side C may be provided an outward angularly extending slit D which is provided in order to facilitate positioning an end 26 of handle 13 into interlocking engagement with respect to panels 16 and 18, see FIGURE 4.

In foming base member 11, intermediate panel 18 is folded about foldline 15 so as to overlie bottom panel 17. Top panel 16 is then folded about foldline 14 so as to overlie intermediate panel 18. Corresponding apertures 24 and 25 in panels 16 and 18 are disposed in registered relation. End flaps 22 and 23 are folded about foldlines 20 and 21 and are adhesively secured to the underside of bottom panel 17, see FIG. 2. Panels 16 and 17 and flaps 22 and 23 cooperate with one another to form a pocket 27 open only at apertures 24 and 25 in panel 16. Disposed within pocket 27 is intermediate panel 18 and the enlarged ends 26 of handle element 13.

Handle element 13 may vary widely in size and shape from that illustrated and may be formed of plastic, metal, or any other suitable material. In the illustrated embodiment handle element 13 includes a bail or center section 28 which is relatively wide and elongated so that it may be readily and comfortably grasped by the hand of the carrier. The opposite end portions 30 of section 28 are of reduced cross-section and terminate in enlarged ends or heads 26, see FIG. 4. Heads 26, when in interlocking position with the base member, are impassable with respect to aperture portion A and are initially passable or insertable with respect to aperture portion B, only when twisted to a predetermined position with respect to end portions 30, in a manner well known by those skilled in the art. To prevent accidental disengagement of the handle element 13 from panels 16 and 18, the dimension of side C of aperture portion B is slightly shorter than the longitudinal dimension of head 26. By reason of this fact therefore a slit D is provided so that aperture portion B might be slightly distorted when the handle element is brought into initial engagement with the base member.

The dimension of each aperture taken normal to side C is such as to permit the bail section 28 of the handle element 13 to lie flat with respect to the exposed surface of top panel 16, when the container, to which it is attached, is being stored or displayed by the merchant.

The assembly 10, as aforenoted, may be disposed intermediate the end closure flaps of the container or may be disposed within the interior of the container and affixed to the interior surface thereof by adhesive. In the first type of installation, the outer end closure flap of the container is provided with an elongated slot in which the bail section 28 of the handle element is disposed when the handle is not being grasped. In the second type of installation, all of the container end closure flaps, which would overlie handle element 13, are provided with suitable slots to accommodate the bail section 28 of the handle.

It will be noted that the bottom panel 17 in the illustrated embodiment, is imperforate and may be exposed to the contents of the container when assembled with the container. In addition, the end flaps 22 and 23 are also imperforate, and thus leakage of the contents or infestation to the contents through pocket 27 is avoided.

By reason of the base member 11 being of a multi-ply construction, thinner, and thus less costly, blank material may be utilized without adversely effecting the safe load-carrying capacity of the handle assembly.

While several embodiments of this invention have been described above, further modifications may be made thereto, and it is contemplated, therefore, by the appended claim, to cover any such modifications as fall within the true spirit and scope of this invention.

I claim:

1. A handle assembly for use with a container, said assembly comprising a base member for engaging a concealed surface of the container, and a handle connected to said base member for projecting from the container; said base member including a plurality of foldable connected panels arranged in superimposed relation whereby one of said panels is sandwiched between a pair of second panels, one of said second panels having a flap foldably connected to an edge thereof and being secured to a corresponding edge portion of the other of said second panels; one of said second panels and said sandwiched panel being provided with means for accommodating an end portion of said handle.

References Cited

UNITED STATES PATENTS 3,134,531 5/1954 Hardy.
3,224,054 12/1965 Lige.

FOREIGN PATENTS 935,539 11/1955 Germany.

BOBBY R. GAY, *Primary Examiner.*

DORIS R. TROUTMAN, *Assistant Examiner.*